US012040730B2

(12) United States Patent
Rafferty et al.

(10) Patent No.: US 12,040,730 B2
(45) Date of Patent: Jul. 16, 2024

(54) ACTIVE FLOW CONTROL SYSTEMS AND METHODS FOR AIRCRAFT

(71) Applicant: The Boeing Company, Chicago, IL (US)

(72) Inventors: Bradley J. Rafferty, St. Louis, MO (US); Mary E. Beckman, West Chester, PA (US); Andrew Leung, Philadelphia, PA (US); Douglas C. Cameron, Ladera Ranch, CA (US)

(73) Assignee: The Boeing Company, Arlington, VA (US)

( * ) Notice: Subject to any disclaimer, the term of this patent is extended or adjusted under 35 U.S.C. 154(b) by 1076 days.

(21) Appl. No.: 16/880,499

(22) Filed: May 21, 2020

(65) Prior Publication Data

US 2021/0362840 A1    Nov. 25, 2021

(51) Int. Cl.
*H02P 29/024* (2016.01)
*B64C 21/04* (2023.01)
*B64C 21/08* (2023.01)
*B64D 45/00* (2006.01)

(52) U.S. Cl.
CPC ........... *H02P 29/024* (2013.01); *B64C 21/04* (2013.01); *B64C 21/08* (2013.01); *B64D 2045/0085* (2013.01); *B64D 2221/00* (2013.01)

(58) Field of Classification Search
CPC ..... B64C 21/04; B64C 21/08; B64D 2221/00; B64D 2045/0085; H02P 29/024
See application file for complete search history.

(56) References Cited

U.S. PATENT DOCUMENTS

| 6,741,056 B1 * | 5/2004 | Hall ..................... G01N 1/2273 |
| | | 318/434 |
| 10,082,243 B1 * | 9/2018 | Hagshenas .............. F02C 7/047 |
| 2012/0091266 A1 * | 4/2012 | Whalen ................. B64C 23/005 |
| | | 137/1 |
| 2016/0061899 A1 * | 3/2016 | Gauthier .............. G01R 31/343 |
| | | 701/34.4 |
| 2017/0057621 A1 * | 3/2017 | Evulet ..................... B64C 21/00 |
| 2020/0240330 A1 * | 7/2020 | Christensen ............ F01D 15/10 |

FOREIGN PATENT DOCUMENTS

EP         0518538 A2 * 12/1992

* cited by examiner

*Primary Examiner* — Thomas C Lee
*Assistant Examiner* — Ameir Myers
(74) *Attorney, Agent, or Firm* — HANLEY, FLIGHT & ZIMMERMAN, LLC

(57) ABSTRACT

Example active flow control systems and methods for aircraft are described herein. An example an active flow control system includes a plenum, a plurality of nozzles fluidly coupled to the plenum, configured to eject high pressure air across a control surface, a compressor to supply pressurized air to the plenum, an electric motor to drive the compressor, and a control system to determine an amount of power input to the electric motor, determine a current speed of the electric motor, and determine a fault has occurred in the active flow control system based on the current speed of the electric motor.

20 Claims, 8 Drawing Sheets

ACTIVE FLOW CONTROL SYSTEMS AND METHODS FOR AIRCRAFT

FIELD OF THE DISCLOSURE

This disclosure relates generally to aircraft, and, more particularly, to active flow control systems and methods for aircraft.

BACKGROUND

Aircraft employ movable control surfaces on the wings to affect the aerodynamic lift of the aircraft. Control surfaces may include, for example, flaps, slats, ailerons, etc. When a control surface such as a flap is deployed, the airflow over the top of the wing separates from the airflow along the bottom of the wing and reattaches downstream of the wing. Some known aircraft employ an active flow control system to reduce the airflow separation and turbulence in the wake of the control surface. Known active flow control systems eject high pressure air in a streamwise direction across the control surface.

SUMMARY

An example an active flow control system for an aircraft includes a plenum, a plurality of nozzles fluidly coupled to the plenum, the plurality of nozzles configured to eject high pressure air across a control surface, a compressor to supply pressurized air to the plenum, an electric motor to drive the compressor, and a control system to determine an amount of power input to the electric motor, determine a current speed of the electric motor, and determine a fault has occurred in the active flow control system based on the current speed of the electric motor.

An example non-transitory computer readable medium includes instructions that, when executed, cause at least one processor to at least determine an amount of power input to an electric motor of a compressor of an active flow control system of an aircraft, determine a current speed of the electric motor while the power is input to the electric motor, and determine a fault has occurred in the active flow control system based on the current speed of the electric motor.

An example method for active flow control system for an aircraft is disclosed herein. The method includes determining, by executing an instruction with at least one processor, a current speed of an electric motor that drives a compressor supplying pressurized air to a plenum coupled to a plurality of nozzles that eject high pressure air across a control surface, determining, by executing an instruction with the at least one processor, whether a current speed of the electric motor is within an operational limit, and disabling, by executing an instruction with the at least one processor, the active flow control system based on the determination of whether the current speed of the electric motor is within the operational limit.

Figure 1:
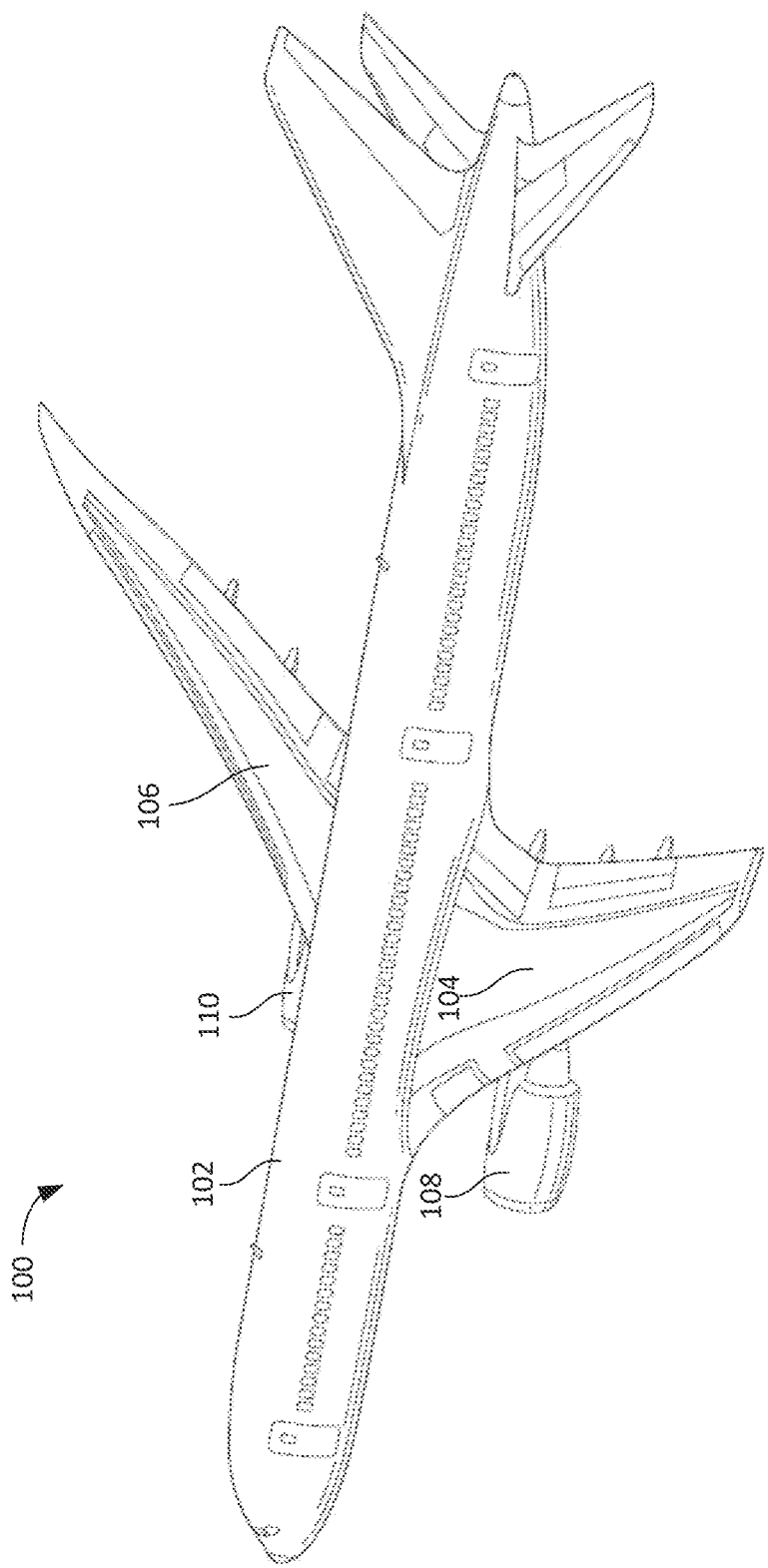
FIG. 1 illustrates an example aircraft in which the example active flow control systems and methods disclosed herein can be implemented.

The figures are not to scale. In general, the same reference numbers will be used throughout the drawing(s) and accompanying written description to refer to the same or like parts. Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Aircraft employ movable control surfaces along the wings and other surfaces to affect the aerodynamic lift and control of the aircraft. Control surfaces may include, for example, flaps, slats, ailerons, etc. In some situations, when a control surface is deployed, the airflow over the wing does not follow the entire upper surface of the wing and control surface. Specifically, the airflow may separate from the surfaces of the wing and the control surface. As a result, a separation pocket or deadzone is created around the upper surface of the wing or the control surface, which causes flow reversal and/or turbulence in the area behind the wing. Such turbulence and flow reversal increases drag and reduces the amount of lift generated by the wing.

To address the above drawbacks, some known aircraft employ an active flow control (AFC) system to reduce the airflow separation and turbulence in the wake of the control surface. Known AFC systems eject high pressure air from a plurality of nozzles arranged along the wing and/or the control surface. In some examples, the air is ejected in a streamwise direction across the wing or the control surface. The high pressure air imparts momentum to the wake or area along the upper surface of the wing or control surface, which typically has relatively low velocity. By energizing this area, the airflow over the wing and control surface remains closer to the skin of the wing and control surface (i.e., reduces the size of the boundary layer) and, thus, decreases the separation or detachment of the airflow from the wing and control surface.

In some examples, an AFC system includes an electric-driven compressor that produces the high pressure air ejected from the nozzles. In some examples, the electric-driven compressor supplies the pressurized air to a plenum, and each of the nozzles is fluidly coupled to the plenum. The AFC system also includes a control system with an AFC control computer for controlling the speed of the electric-driven compressor for achieving a desired mass flow rate. As with most systems on an aircraft, it is desirable to track the state and health of the AFC system during flight. In particular, faults, such as clogs, leaks, dirty filters, compressor wear, etc. can occur in the AFC system. These faults can result in reduced performance and/or damage to the AFC system.

Conventional approaches to achieving such health monitoring would require additional instruments outside of the core components of system. In particular, pressure sensors and mass flow meters would be needed throughout the AFC system ducting (e.g., at each branch of the flow system). These components would consume precious volume in small integration spaces, add weight to the platform, reduce the quantifiable reliability of the system, and require their own dedicated computer resources.

Example AFC systems and methods are disclosed herein that can monitor system health and detect faults without the need for additional sensors or equipment that would be required using conventional approaches. The example systems and methods leverage information from existing components. In particular, examples disclosed herein monitor the power (i.e., voltage and current) input to an electric motor driving the compressor as well as the compressor speed estimated from back-EMF (electromotive force) of the electric motor. The control system compares the power and speed measurements to nominal performance values for the compressor using a performance map for the compressor generated in advance. Depending on whether the measurements fall outside of expected values, the control system can detect a fault and identify which type of fault it may be, such as airflow clog, leak, dirty filter, compressor wear, etc.

In some examples, the control system can act to control and/or correct the fault. For example, if the control system determines a clog has occurred (which results in a lower mass flow rate by the compressor), the system can increase the power to electric motor to increase the overall mass flow rate produced by the compressor to compensate for this reduction. Additionally or alternatively, in some examples, the AFC system may generate an alert to indicate to a pilot or mechanic that a fault has occurred or a possible fault may occur. In some examples, if the compressor is determined to be operating outside of certain operational limits, the AFC system can be deactivated or another action can be taken to mitigate the situation. Therefore, the examples disclosed herein analyze input to and output from an electric-driven compressor to infer any threats to system health and predict the need for system maintenance. Further, the examples disclosed herein do not require additional sensors or equipment that would otherwise increase volume, require additional power, add weight to the platform, and reduce reliability of the system.

The example systems and methods disclosed herein can be implemented in connection with any active flow control for a control surface, including fixed control surfaces or movable control surfaces. The example systems and methods disclosed herein can be similarly implemented in connection with systems that provide pressurized air across internal flow surfaces, such as the environmental control system (ECS) ducts or the engine inlets.

Turning now to the figures, FIG. 1 illustrates an example aircraft 100 in which the examples disclosed herein can be implemented. In the illustrated example, the aircraft 100 includes a fuselage 102, a first (left) wing 104 coupled to the fuselage 102, and a second (right) wing 106 coupled to the fuselage 102. The aircraft 100 also includes a first engine 108 coupled to the first wing 104 and a second engine 110 coupled to the second wing 106. In other examples, the aircraft 100 may have multiple engines coupled to each of the first and second wings 104, 106 and/or disposed in other locations on the aircraft 100 (e.g., coupled to the fuselage 102, coupled to a tail section of the aircraft 100, etc.). In addition to producing thrust, each of the engines 108, 110 drives one or more generators for producing electrical power for use by one or more systems of the aircraft 100.

The first and second wings 104, 106 include movable control surfaces such flaps, slats, ailerons, spoilers, and/or other high lift devices that are located along the leading and trailing edges of the first and second wings 104, 106. Further, control surfaces can also be employed on a tail section of the aircraft 100. The control surfaces may be displaced or extended to change the aerodynamic lift of the aircraft 100 (e.g., during take-off or landing). When extended from the first wing 104, for example, a control surface may increase the effective size, camber and/or area of the first wing 104, thereby increasing the lift of the first wing 104. However, when the control surface is deployed, the airflow over an upper surface of the first wing 104 separates from the airflow beneath the first wing 104 and reattaches downstream of the first wing 104. This flow separation results in deadzone adjacent an upper surface of the first wing 104. Therefore, the aircraft 100 may include an AFC system to reduce this separation and improve aerodynamic efficiency.

Figure 2:
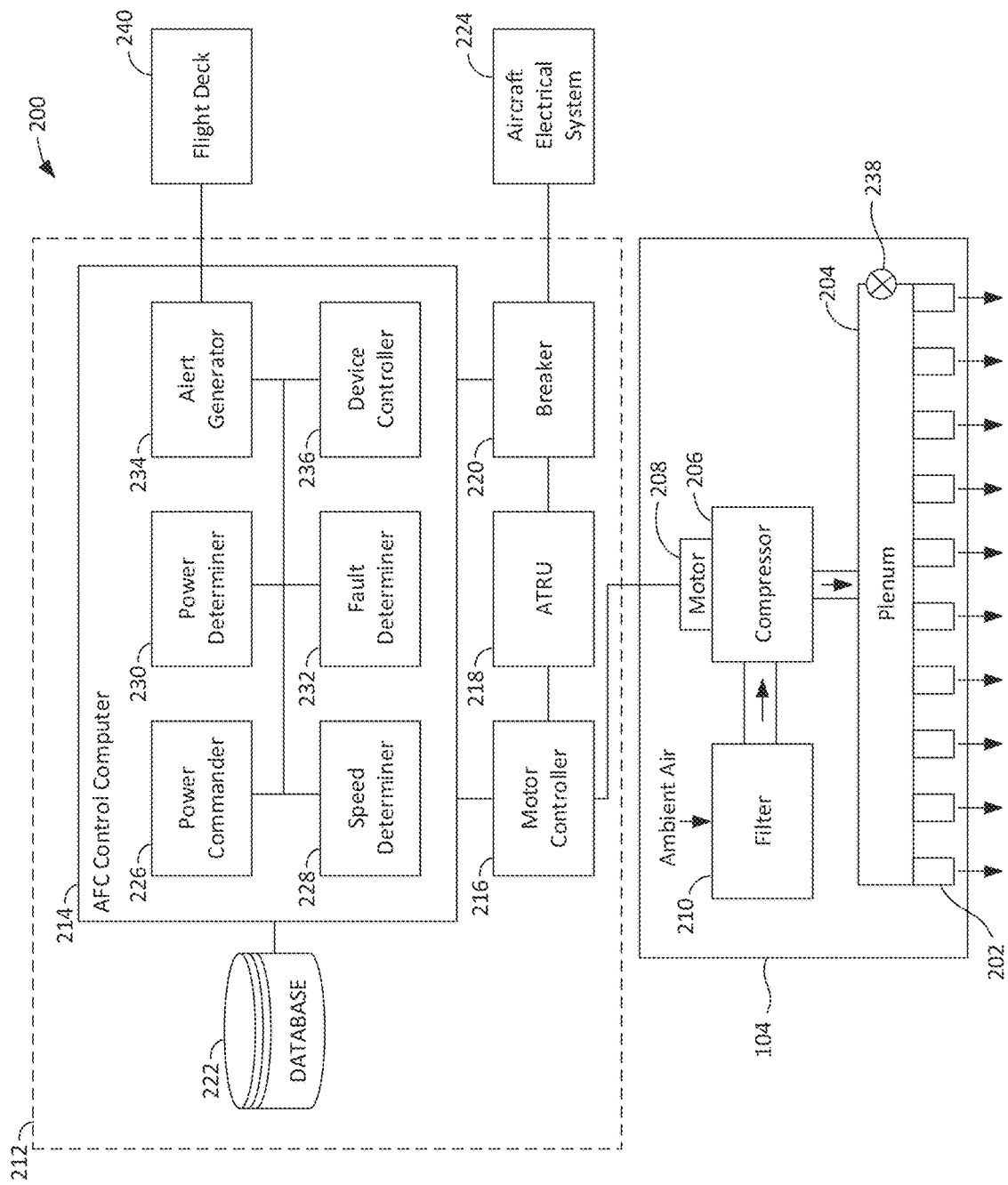
FIG. 2 is a block diagram of an example active flow control (AFC) system that can be implemented in connection with the aircraft of FIG. 1.

FIG. 2 is a block diagram of an example active flow control (AFC) system 200 that can be implemented on the example aircraft 100 of FIG. 1. The AFC system 200 can be operated to reduce airflow separation occurring along a surface of the aircraft 100. The example AFC system 200 is described in connection with the first wing 104. However, it is understood that the example AFC system 200 can be implemented in connection with any other surface on the aircraft 100. Additionally or alternatively, the active flow control system 200 can be used to provide pressurized air for internal flows in the aircraft 100, such as environmental control system (ECS) ducts or engine inlets.

In the illustrated example, the AFC system 200 includes a plurality of nozzles 202 (e.g., ejectors) (one of which is referenced in FIG. 2). The nozzles 202 can be implemented as actuators or fluidic oscillators. The nozzles 202 are configured to eject high pressure air across a surface (e.g., a control surface). In this examples, the nozzles 202 are disposed along an upper surface (e.g., a top panel) of the first wing 104. The nozzles 202 eject (e.g., dispense) pressurized air in a streamwise direction across the first wing 104. By ejecting high speed air along the first wing 104, momentum is imparted in the wake behind the first wing 104, which causes the airflow over the upper surface of the first wing 104 to remain closer to the upper surface of the first wing 104 (and/or the upper surface of a flap or other control surface) and, thus, reduces separation. In the illustrated example, the AFC system 200 includes ten nozzles 202. However, in other examples, the AFC system 200 can include more or fewer nozzles.

In the illustrated example, the AFC system 200 includes a plenum 204, sometimes referred to as an air distribution plenum, header, or manifold. In some examples, the plenum 204 is disposed in the first wing 104. The nozzles 202 are fluidly coupled (e.g., directly or via one or more ducts or fluid lines) to the plenum 204. The plenum 204 is supplied with pressurized air, which is then ejected via the nozzles 202 to cause the above-noted effect.

In the illustrated, the AFC system 200 includes a compressor 206 to supply pressurized air to the plenum 204. The AFC system 200 includes an electric motor 208 to drive the compressor 206. In some examples, the compressor 206 is a centrifugal compressor that includes an impeller. In such an example, the electric motor 208 is coupled to and drives the impeller. In other examples, the compressor 206 can be implemented as another type of compressor, such as a reciprocating compressor, a diaphragm compressor, a rotary screw compressor, and/or any other type of compressor. The electric motor 208 can be part of or integrated into the compressor 206, referred to as an electric-compressor or electric-driven compressor. The compressor 206 receives inlet air from an inlet, increases the pressure of the air, and provides the pressurized air to the plenum 204. In some examples, the inlet air is ambient air from outside of the aircraft 100. For example, an inlet opening may be provided on the surface of the first wing 104 to receive ambient air. In some examples, the inlet air flows through a filter 210 before being pressurized by the compressor 206.

The AFC system 200 includes a control system 212 to control the operation of the compressor 206 and, thus, control the operation of the AFC system 200. In the illustrated example, the control system 212 includes an AFC control computer 214, a motor controller 216, an autotransformer rectifier unit (ATRU) 218, a breaker 220 (e.g., a power distribution unit), and a database 222.

Electrical power is supplied to the control system 212 by an aircraft electrical system 224. The aircraft electrical system 224 may include one or more generators driven by the engines 108, 110 (FIG. 1). The motor controller 216 controls the supply of electrical power to the electric motor 208 of the compressor 206 based on commands from the AFC control computer 214. In particular, the motor controller 216 can activate the electric motor 208 by inputting or applying a certain amount of power to the electric motor 208 (via the ATRU 218), thereby driving the compressor 206 to produce the pressurized air.

In some examples, the motor controller 216 is to apply a certain amount of power to the electric motor 208 as commanded by the AFC control computer 214 (e.g., based on or more flight conditions). The motor controller 216 regulates the power to maintain the selected input power. In other examples, the motor controller 216 is to regulate the power to achieve a certain speed commanded by the AFC control computer 214. For example, the motor controller 216 can sense the back-EMF (electromotive force) of the electric motor 208. The motor controller 216 uses this back-EMF to determine or calculate the speed of the electric motor 208 and thereby regulate the power to the electric motor 208 to achieve the desired speed.

In the illustrated example, the AFC control computer 214 includes a power commander 226, a speed determiner 228, a power determiner 230, a fault determiner 232, an alert generator 234, and a device controller 236. The power commander 226 determines or selects a certain power to be applied to the electric motor 208 for achieving a desired mass flow rate through the nozzles 202. In some examples, the desired mass flow rate is based on one or more flight conditions, such as the altitude of the aircraft 100, the ambient temperature and/or pressure, the speed of the aircraft 100, etc. For example, depending on the altitude or the speed of the aircraft 100, the mass flow rate to reduce the flow separation may be higher or lower. Additionally or alternatively, the desired mass flow rate can be based on the performance parameters of the AFC system 200 (e.g., the size of the ducting) and/or the performance parameters of the compressor 206. In some examples, the database 222 includes a table or listing of different power values corresponding to different mass flow rates. Depending on the desired mass flow rate, the power commander 226 selects the corresponding power to be input to the electric motor 208. The motor controller 216 then applies the power (and/or otherwise enables power to be input) to the electric motor 208 to drive the compressor 206 for achieving the desired mass flow rate.

While the electric motor 208 is operating, the speed determiner 228 monitors the current speed of the electric motor 208 (and, thus, the speed of the compressor 206). In some examples, the speed determiner 228 determines the current speed of the electric motor 208 based on back-EMF of the electric motor 208. For example, the motor controller 216 can relay the back-EMF values to the speed determiner 228, which determines (e.g., calculates) the current speed of the electric motor 208. The power determiner 230 monitors or determines the amount of power input to the electric motor 208. The power determiner 230 can determine the power input to the electric motor 208 based on the power commanded by the power commander 226 and/or feedback from the motor controller 216.

The example control system 212 can detect faults, monitor system health, and predict maintenance needs for the AFC system 200. The example control system 212 can not only determine when a fault has occurred, but can also identify the fault and take one or more corrective actions. One example of a fault is a clog. For example, one or more of the nozzles 202 may become clogged and/or the filter 210 may become clogged. This can cause a reduction in the overall mass flow rate out of the nozzles 202 and adversely affect the operating performance of the compressor 206. Another example of a fault is a leak. A leak may occur, for example, if there is a poor connection with a pipe fitting, a puncture within a duct, a degrading sealant, etc. A leak allows the pressurized air downstream of the compressor outlet (e.g., in the plenum 204) to leak. This can reduce the overall mass flow rate out of the nozzles 202 and adversely affect the operating performance of the compressor 206.

In some examples, the fault determiner 232 determines whether a fault has occurred in the AFC system 200 based on the current speed of the electric motor 208 (determined by the speed determiner 228). In some examples, to determine whether a fault has occurred, the fault determiner 232 determines whether the current speed of the electric motor 208 is within a threshold range of an expected speed of the electric motor 208 associated with the power input to the electric motor 208. For example, for a given input power, and a given set of parameters relating to the aircraft 100 and the AFC system 200, the electric motor 208 is expected to run at a certain speed. Therefore, the expected speed is based on at least one of an aircraft flight condition (e.g., the ambient temperature, the altitude, the speed, etc.), a power and speed performance map for the AFC system 200, or a power and speed performance map for the compressor 206. The flight condition(s) may be determined via one or more measurements. The power and speed performance map for the AFC system 200 may include a plurality of curves, each corresponding to the performance at one flight condition (e.g., one combination of ambient temperature, pressure, and density). The power and speed performance map for the compressor 206 can similarly include a plurality of curves representing different conditions. The power and speed performance map for the AFC system 200 may lie within the power and speed performance map of the compressor 206. In some examples, the power and speed performance map for the AFC system 200 and the power and speed performance map of the compressor 206 are saved in the database 222. The fault determiner 232 determines whether the current speed is within a threshold range of the expected speed. The threshold range may be predetermined and stored in the database 222. For example, assume the expected speed of the electric motor 208 is 20.0 kilo revolutions-per-minute (krpm), and the threshold range is 2% of the expected speed. The fault determiner 232 determines whether the current speed of the electric motor 208 is between 19.6 krpm and 20.4 krpm (i.e., 20.0 krpm±2%). If the current speed is within this threshold range, no faults have occurred and the AFC system 200 continues to operate as normal.

However, if the fault determiner 232 determines the current speed is outside of the threshold range (e.g., less than 19.6 krpm or greater than 20.4 krpm), it is indicative that a possible fault has occurred. In some examples, if the current speed is outside of the threshold range, the fault determiner 232 determines whether the compressor 206 and the electric motor 208 are operating within operational limits of the compressor 206 and the electric motor 208. In particular, the compressor 206 and the electric motor 208 may have certain operational limits. Operating outside of these limits can cause significant damage and/or failure of the compressor 206, the electric motor 208, and/or other components of the AFC system 200. The operational limits can be predetermined and stored in the database 222.

In some examples, if the compressor 206 and the electric motor 208 are operating outside of the operational limits, the control system 212 takes a corrective action. For example, the device controller 236 can activate (e.g., switch) the breaker 220, which ceases power to the electric motor 208 and, thus, disables the AFC system 200. As another example, the device controller 236 can open a relief valve, such as a relief valve 238 coupled to the plenum 204, to relieve pressure from the plenum 204 and/or another location of the flow system ducting. In other examples, the control system 212 can take other actions to immediately correct the situation.

If the compressor 206 and the electric motor 208 are operating within their operational limits, but outside of the threshold speed range, the fault determiner 232 determines the type of fault that has occurred, such as a clog or a leak. In some examples, the fault determiner 232 determines whether a clog or a leak has occurred based on the current speed of the electric motor 208. For example, the fault determiner 232 compares the current speed to a threshold speed. The speed threshold may be stored in the database 222. The threshold speed may be a percentage or absolute value of the expected speed associated with the power input to the electric motor 208. For example, the threshold may be 5% of the expected speed. If the current speed is higher than 5% above the expected speed for a given power, it is indicative of a clog (e.g., a clog in one or more of the nozzles 202, a clog in the filter, etc.). If the current speed is lower than 5% below the expected speed for a given power, it is indicative of a leak. Therefore, the threshold range is 95% to 105% of the expected speed. In other examples, the threshold can be another percentage. In other examples, the threshold can be an absolute value. For example, if the expected speed is 15 krpm, and the threshold is 2 krpm, then the upper threshold is 17 krpm and the lower threshold may be 13 krpm. In other examples, the threshold can be another absolute value. Alternatively, the fault determiner 232 can monitor the amount of power usage by the electric motor 208, where similar to motor speed, the amount of power used by the electric motor 208 can be indicative of a fault such as a clog or a leak, where such faults are detectable if the amount of power used by the motor is, for example, lower than 5% below the expected power usage or higher than 5% above the expected power usage.

Depending on the type of fault, the control system 212 can take an action to move the performance of the AFC system 200 back toward nominal performance. For example, assume that one or multiple ones of the nozzles 202 are clogged. The clog causes a restriction of air flow rate (through the nozzles 202), resulting in an increased pressure in the plenum 204 that may cause an increase in load on the electric motor 208. In such an example, the motor speed is increased for the same power input to the electric motor 208. As a result, the compressor 206 produces a lower mass flow rate than the desired mass flow rate. The control system 212 can determine the current speed of the electric motor 208, and compare the current speed to a threshold (such as a threshold of a 10 percent reduction in motor speed relative to a prior read motor speed or within a time interval, or a threshold range from an expected speed). The control system 212 is configured to determine the presence of a clogged nozzle based on detecting a change in motor speed that exceeds a predetermined threshold, and based on the threshold being exceeded and/or the remaining number of open nozzles, the control system 212 is configured to responsively determine an increased motor speed and/or increased power level supplied to the electric motor 208 (based on a database of motor speeds and mass flow rate values) to yield an increased motor speed that would increase the current mass flow rate restricted by the clogged nozzle to a desired mass flow rate for maintaining active flow control for a system or across a surface (e.g., a movable control surface). In some examples, to increase the mass flow rate out of the open nozzles 202 back to the desired mass flow rate, the power commander 226 selects a higher power to be applied to the electric motor 208 that results in a higher mass flow rate that matches or substantially matches the desired mass flow rate. Example plots and tables are disclosed in further detail herein that can be used to select the power for the electric motor 208. As another example, the motor controller 216 can reverse the compressor 206 (e.g., momentarily or periodically) to attempt to remove the clog.

On the other hand, assume a leak has occurred. In such an instance, the current speed is reduced for the same power input to the electric motor 208. In such an instance, the compressor 206 produces a higher mass flow rate than expected. However, because the air is leaking, the overall mass flow rate ejected by the nozzles 202 is reduced. In some examples, the control system 212 can identify the leak and estimate the size of the leak by connecting speed and power to flow parameters via fan scaling laws. In some examples, the power commander 226 can select a higher power to be applied to the electric motor 208 (e.g., up to the operational limits of the compressor 206 and the electric motor 208) to increase the mass flow rate out of the nozzles 202 back to the desired mass flow rate. If the leak is sufficiently large, increasing the power to the electric motor 208 may have a negligible effect. In such an instance, the electric motor 208 is likely operating outside of its operational limits, in which case the control system 212 can deactivate the AFC system 200 and generate an alert (e.g., via the alert generator 234). In other examples, a leak is identified and an alert is generated but no corrective action is taken.

In addition to or as an alternative to dynamically adjusting the power to the electric motor 208 and/or taking another corrective action, the alert generator 234 can generate an alert, as mentioned above. The alert may be used to indicate to a pilot, a mechanic, and/or any other aircraft personnel that a fault has occurred in the AFC system 200 and/or the type of fault that has occurred. In some examples, the alert generator 234 generates an alert in a flight deck 240 in a cockpit of the aircraft 100. The alert indicates to the pilot that a fault has occurred but the AFC system 200 may still be operational or partially operational. In some examples, the alert generator 234 generates an alert if the AFC system 200 is disabled, such as after determining the electric motor 208 is operating outside of its operational limits.

Instead of commanding a certain power and monitoring for a change in speed of the electric motor 208, the control system 212 can demand a certain speed and monitor for a subsequent power increase or decrease. For example, the power commander 226 may command the electric motor 208 to operate at a certain speed (which typically produces a desired mass flow rate). The motor controller 216 activates the electric motor 208 to drive the compressor 206 at the selected speed. The power determiner 230 monitors the power input to the electric motor 208 to maintain the selected speed. If the power is less than expected (i.e., less power required to obtain the speed), it is indicative of a clog, such as a clog in one or more of the nozzles 202 and/or the filter 210. As a result, the compressor 206 is producing a lower mass flow rate for the selected speed. Therefore, the fault determiner 232 determines a clog has occurred. In such an instance, the control system 212 can generate an alert and/or take a corrective action. For example, the power commander 226 can command a different (e.g., higher) speed to account for the lower mass flow rate. As another example, a certain speed is commanded and the power required to reach the speed is higher than expected. More power at a given flight condition indicates more mass flow and, thus, a leak in the AFC system 200 that allows more airflow. Therefore, the fault determiner 232 can identify a leak has occurred. In such an instance, the control system 212 can generate an alert and/or take a corrective action. Therefore, if a specific speed is commanded and the measured input power is lower than expected, it is indicative of a clog, whereas if a specific speed is commanded and the measured input power is higher than expected, it is indicative of a leak. Conversely, if a specific power is commanded and the measured speed is lower than expected, it is indicative of a leak, whereas if a specific power is commanded and the measured speed is higher than expected, it is indicative of a clog.

As another example, for a given flight condition, the electric motor 208 is expected to draw a certain amount of power. If, over time, the input power steadily increases or decreases, it can be indicative of loss of efficiency due to compressor wear (e.g., motor degradation, impeller wear, etc.). In such an instance, the fault determiner 232 can identify the electric motor 208 and/or the compressor 206 are worn down. The control system 212 can generate an alert or take a corrective action. As another example, the control system 212 can monitor for transient or dynamic compressor behavior, such as startup rise time to a certain speed, which can be indicative of compressor degradation. Therefore, the control system 212 can determine, based on these techniques, whether a fault has occurred or whether a fault is approaching, in which case predictive or preventative maintenance can be performed.

Therefore, the example AFC system 200 can monitor for faults and take corrective actions without the need for additional hardware (e.g., pressure sensors, flow meters, temperature sensors, etc.). Because the AFC system 200 leverages existing hardware to accurately determine speed and power without the need for additional equipment, no additional sensors are required. This improves the reliability of the AFC system 200 as well as reduces complexity, volume, cost, and weight compared to conventional approaches.

Figure 3:
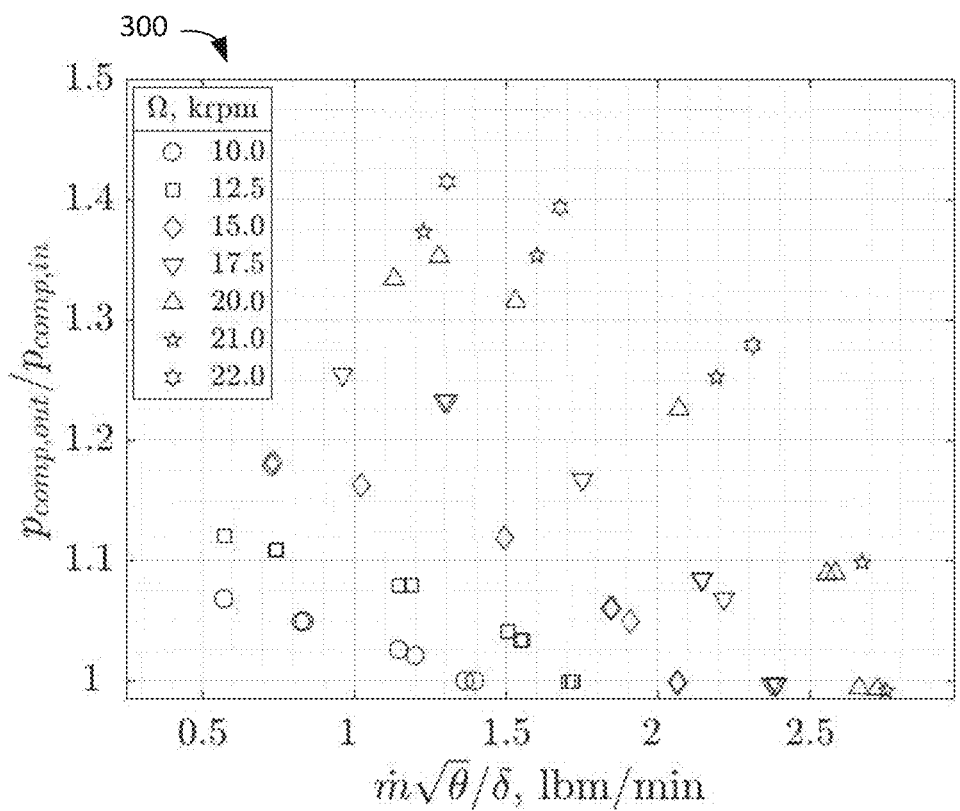
FIG. 3 is a plot of an example compressor performance map of pressure ratio versus mass flow rate that can be generated for an example compressor and used by the example AFC system of FIG. 2.

FIG. 3 is plot 300 of a compressor performance map that may be generated for the compressor 206. The Y-axis is the pressure ratio of the compressor 206 (pressure-out/pressure-in) and the X-axis is the mass flow rate (corrected for temperature) of the compressor 206 in pound mass per minute (lbm/min). $\dot{m}$ is the mass flow rate, $\theta$ is the inlet temperature ratio, and $\delta$ is the inlet pressure ratio. The compressor performance map illustrates the operational limits and capabilities of the compressor 206. Various points are shown in the plot 300 for different speeds ($\Omega$=kilo-revolutions per minute (krpm)) at different pressure ratios and mass flow rates. As shown, for a given speed, the pressure ratio increases as the mass flow rate decreases, and vice versa. Such a performance map can be determined ahead of time for any given compressor by testing the compressor in various conditions. The performance map for the compressor 206 can be stored in the database 222.

Figure 4:
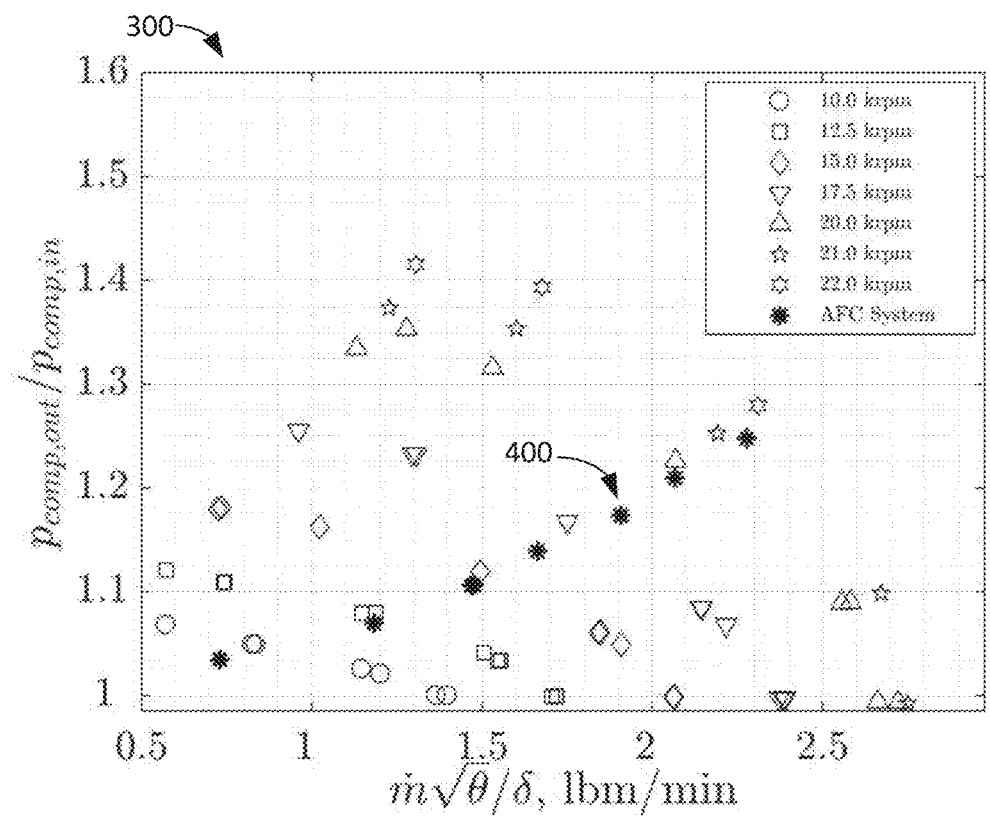
FIG. 4 is the plot from FIG. 3 with a nominal performance curve for the example AFC system overlaid on the example compressor performance map that can be generated for the example compressor and used by the example AFC system of FIG. 2.

FIG. 4 shows the plot 300 of the compressor performance map from FIG. 3 with a nominal performance curve 400 for the AFC system 200 overlaid on the performance map. The nominal performance curve 400 is represented by seven data points. The nominal performance curve 400 is a characteristic curve that determines the pressure ratio required to produce a given corrected mass flow rate when the AFC system 200 is operating under normal (nominal) conditions without faults. The nominal performance curve 400 can be generated ahead of time via testing and stored in the database 222.

Figure 5:
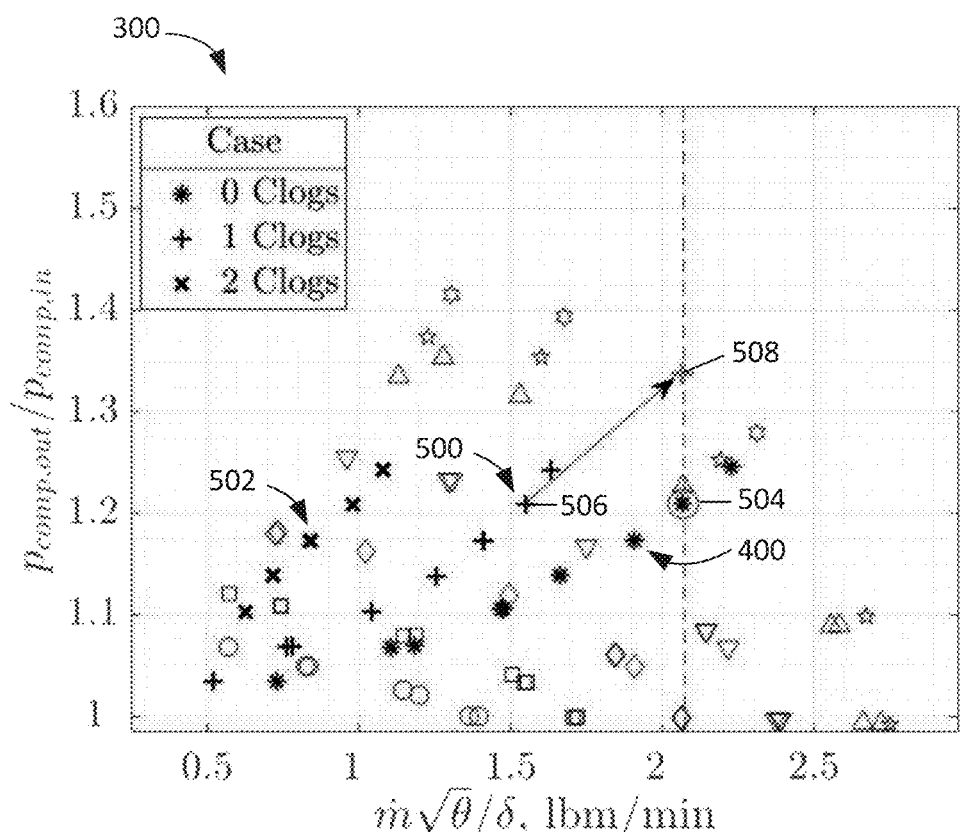
FIG. 5 is the plot from FIG. 4 with additional performance curves for one-clog and two-clog scenarios that can be generated for the example compressor and used by the example AFC system of FIG. 2.

FIG. 5 shows the plot 300 of the compressor performance map with three performance curves of the AFC system 200 overlaid on the map. The three performance curves include the nominal performance curve 400 for zero clogged nozzles (nominal), a one-clog performance curve 500 (represented by seven data points) when one of the nozzles 202 is clogged, and a two-clog performance curve 502 (represented by five data points) when two of the nozzles 202 are clogged. As shown in FIG. 5, a given pressure ratio achieves less mass flow rate through the AFC system 200 as the number of clogs increases. As such, the pressure ratio must be driven up to produce the same mass flow rate as the nominal performance curve 400 (zero clogs). For example, assume the compressor 206 is operating at nominal point 504 on the nominal performance curve 400, which has a mass flow rate of about 2.07 lbm/min and a pressure ratio of about 1.21. If one of the nozzles 202 becomes clogged and the pressure ratio stays the same, the mass flow rate reduces to 1.55 lbm/min at point 506 on the one-clog performance curve 500. To achieve the same mass flow rate in the one-clog case, the pressure ratio would need to be increased to 1.34, as shown at point 508 on the one-clog performance curve 500. Thus, the pressure ratio needs to increase to achieve the same mass flow rate as the zero-clog case. The control system 212 can use this data to determine how much to increase or decrease the speed and/or input power to achieve the desired mass flow when a fault occurs.

Figure 6:
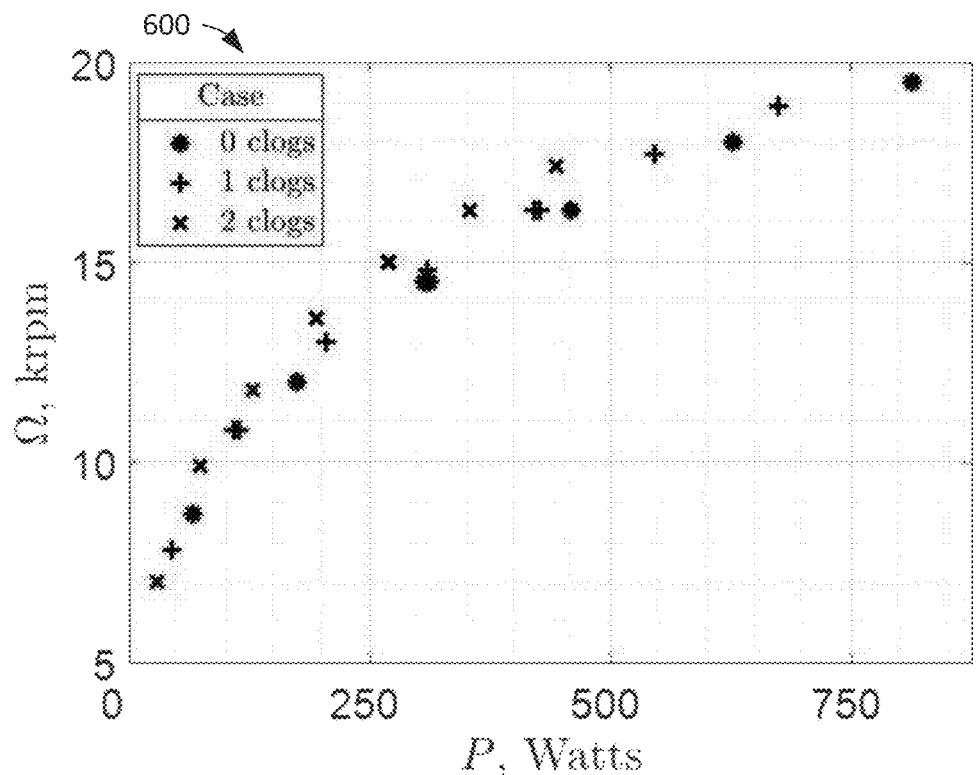
FIG. 6 is a plot of experimental data showing the effects of clogged nozzles in the example AFC system of FIG. 2 plotted as speed versus power and which can be used by the example AFC system of FIG. 2.

In some examples, it is desirable to monitor and correct these conditions without the need for pressure or mass flow rate knowledge. Therefore, these clog curves can be plotted in a compressor performance format. For example, FIG. 6 is a plot 600 of experimental data showing the effects of clogged nozzles in the AFC system 200 on the compressor performance. The Y-axis is the speed Q of the compressor 208 and the electric motor 208 in krpm. The X-axis is the power applied to the electric motor 208 in watts. Data points are shown for zero-clog, one-clog, and two-clog cases. For a given compressor speed, the required input power decreases as more of the nozzles 202 are blocked or clogged. As such, the speed required to achieve the same power as the no-clog case is increased.

Figure 7:
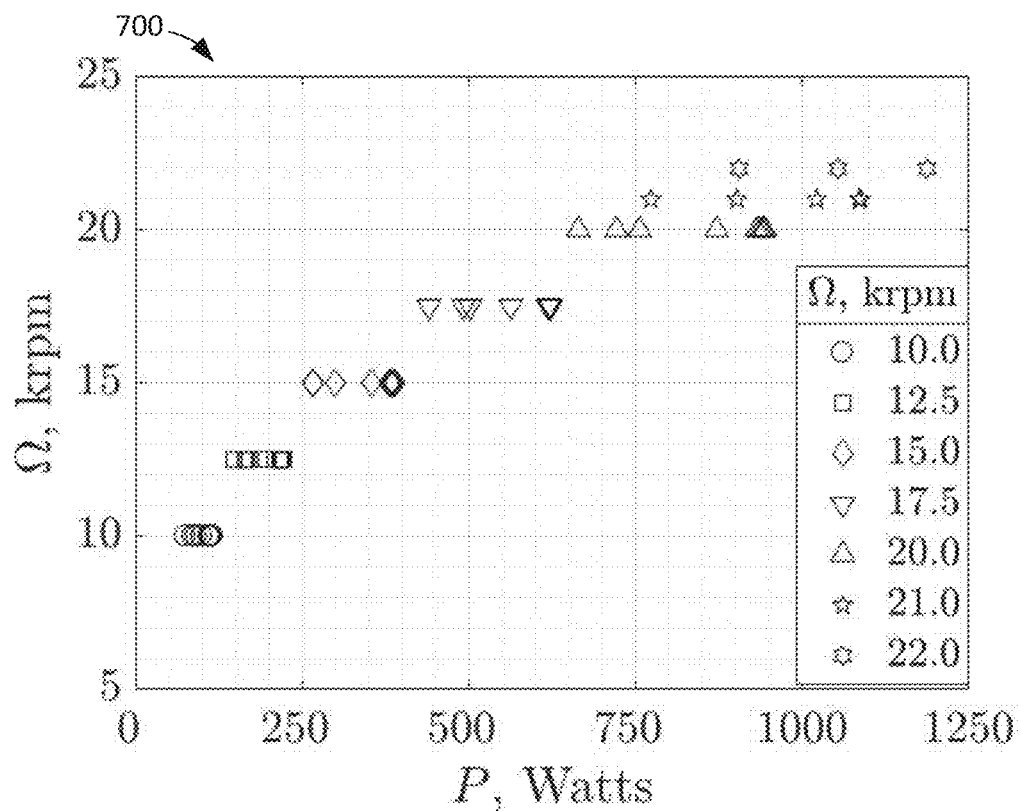
FIG. 7 is a plot of the compressor performance map of FIG. 3 plotted as speed versus power that can be generated for the example compressor and used by the example AFC system of FIG. 2.
Figure 8:
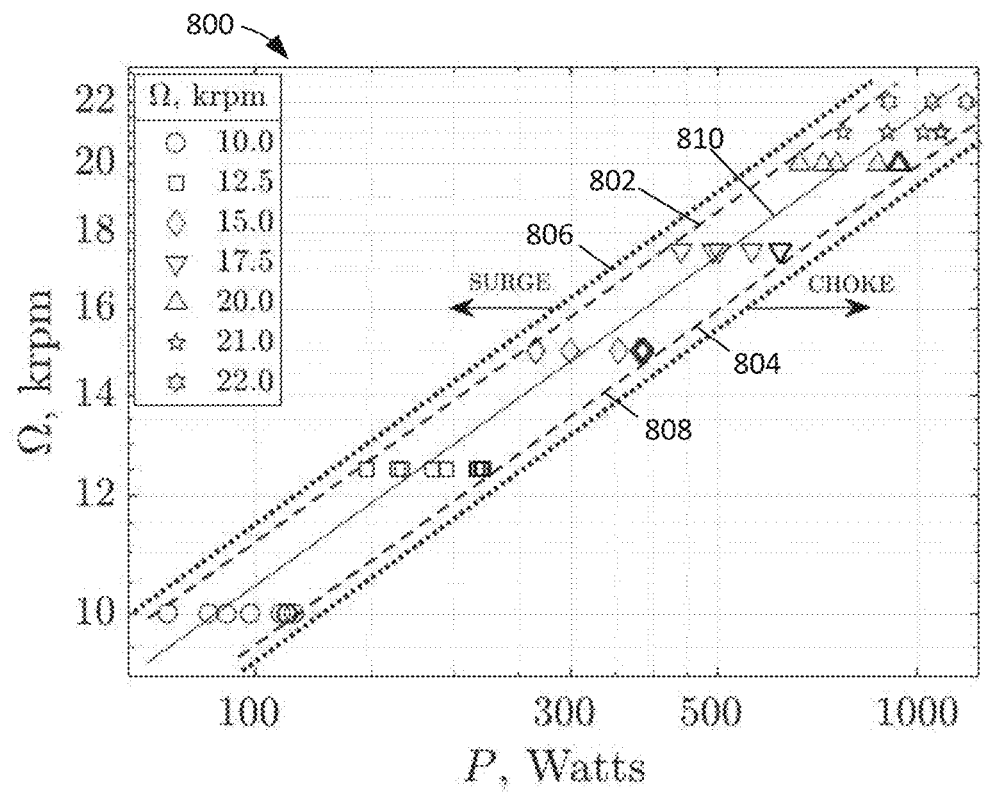
FIG. 8 is a plot of the compressor performance map of FIG. 7 on a log scale that can be generated for the example compressor and used by the example AFC system of FIG. 2.

FIG. 7 is a plot 700 of the same compressor performance map as in FIG. 3 but represented as speed (Y-axis) versus power (X-axis). FIG. 8 is a plot 800 of the same compressor performance map of FIG. 7 on a log scale (i.e., log(power) and log(speed)). As shown, the data points transform smoothly to a linearly-bound map when plotted as log (speed) versus log(power). This map can be used to detect off-nominal performance. Nominal boundary lines 802, 804 are overlaid on the plot 800. The nominal boundary lines 802, 804 represent the nominal bounds of the compressor performance. Operational limit lines 806, 808 are also overlaid on the plot 800. The operational limit lines 806, 808 represent the notional limits of acceptable operation that should not be passed. To the left of the operational limit line 806, the compressor 206 is operating in a detrimental surge state, and a corrective action may be taken. To the right of the operational limit line 808, the compressor 206 is operating in a detrimental choke state and a corrective action may be taken. Any given nominal AFC system falls along a line 810 as a linear curve. The plot 800 and the lines 802-810 can be determined ahead of time via testing and stored in the database 222.

Figure 9:
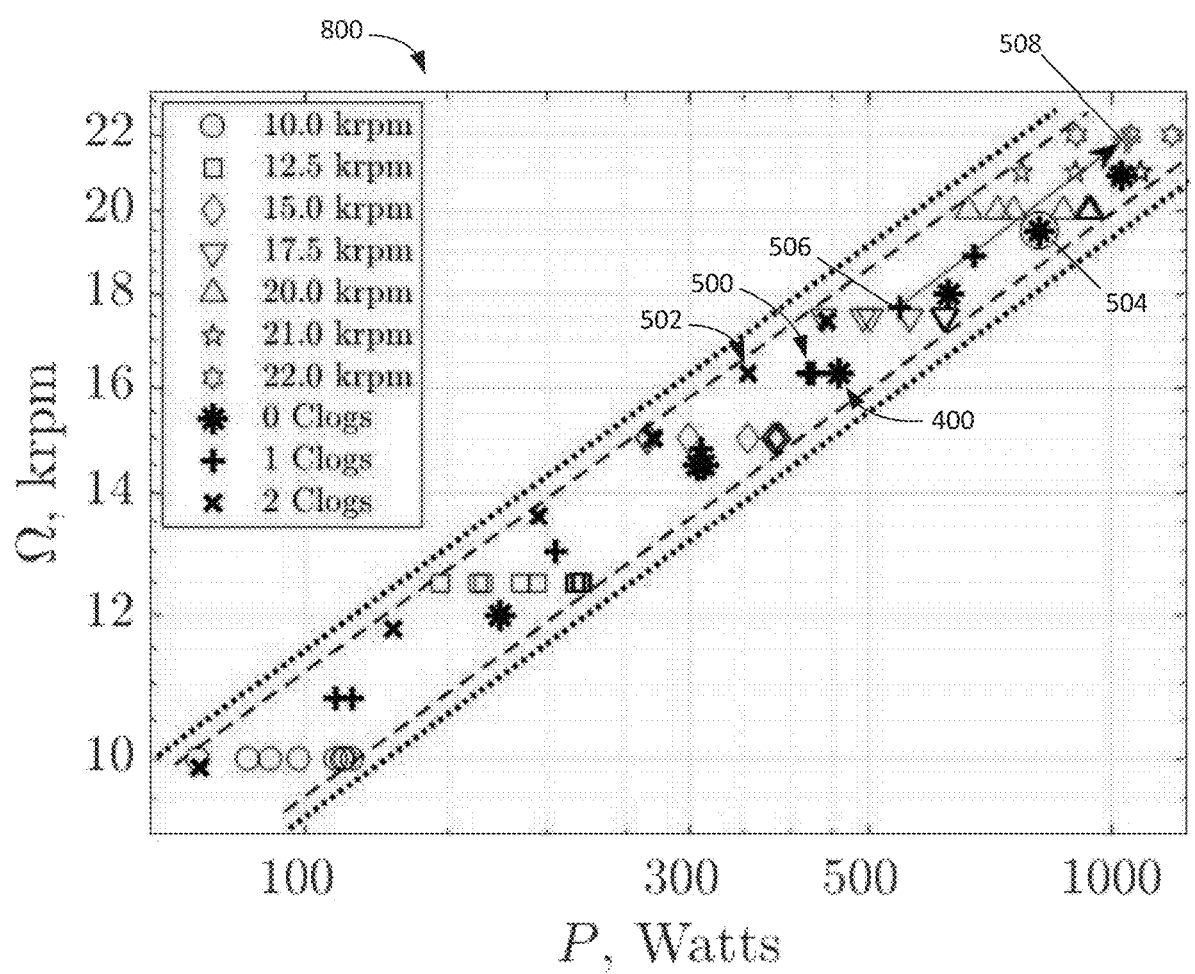
FIG. 9 is the plot of FIG. 8 with performance curves for zero-clog, one-clog, and two-clog scenarios that can be generated for the example compressor and used by the example AFC system of FIG. 2.

FIG. 9 shows the plot 800 (speed versus power) with the nominal performance curve 400, the one-clog performance curve 500, and the two-clog performance curve 502 from FIG. 5. As shown, a given input power achieves higher compressor speed as the number of clogs increases. In other words, the speed must be increased to accommodate the same power from the compressor 206 as the nominal performance curve 400 (for zero-clogs). For example, assume the compressor 206 is operating at the nominal point 504. If a single clog occurs, the compressor 206 may operate at the point 506 (which equates to less mass flow rate as shown in FIG. 5). To achieve the same power output as the nominal point 504, the compressor 206 can be operated at a higher power and higher speed at the point 508, which equates to the same mass flow rate (as shown in FIG. 5). This map can be generated ahead of time and saved in the database 222. The fault determiner 232 can use this map to identify the type of fault (e.g., a clog) and the degree of the fault (e.g., one clog, two clog, three clogs, etc.). The power commander 226 can use the map to determine a new operating power and/or speed to move the compressor 206 back to its nominal performance.

Speed and power can be linked back to flow parameters (e.g., mass flow rate, coefficient of momentum, coefficient of blowing, etc.) through, for example, fan scaling laws. For example, a change in volumetric flow rate, Q, is related to fan speed by:

$$Q' = Q\left(\frac{D'}{D}\right)^3\left(\frac{\Omega'}{\Omega}\right)$$

D is the fan diameter (which is constant in most applications), $\Omega$ is the fan rotational speed, and the subscript ' denotes a new value. For example, if the ratio $$\frac{\Omega'}{\Omega} = 2,$$

then the new speed $\Omega'$ is twice the old or expected speed, $\Omega$, and consequently (per the fan laws), the new flow rate, Q', is twice the old flow rate. Additionally, by definition, mass flow rate is $\dot{m} = \rho Q$, where p is the fluid density. Consequently, the new mass flow rate $\dot{m}'$ can be expressed as follows:

$$\dot{m}' = \dot{m}\left(\frac{\rho'}{\rho}\right)\left(\frac{D'}{D}\right)^3\left(\frac{\Omega'}{\Omega}\right)$$

The AFC control computer 214 can use this information and other such scaling laws to link the expected speed $\Omega$ and the actual measured speed $\Omega'$ (measured via back-EMF or other techniques). This link between the compressor parameters and the flow parameters can be extended to any other flow parameter of interest to maintain the desired AFC system performance, and can be computed real-time by the AFC control computer 214 of FIG. 2.

All of the example plots and data shown in FIGS. 3-9 can be pre-determined and stored in the database 222 for used by the AFC control computer 214. This data can be determined via bench tests, real flight tests, and/or flow modeling tools. Using this data, the control system 212 can monitor and control the AFC system 200 to maintain optimum health and performance. At a given flight condition (e.g., altitude, temperature, etc.) and at a given power commanded to the compressor 206, there is an expected speed achieved by the compressor 206. Any off-nominal states (speed and/or power) are indicated and proceed with mitigating control (e.g., varying the speed to match the desired power set point). Any operation beyond acceptable limits may result in an immediate corrective action. Thus, the example control system 212 leverages knowledge of the performance characteristics of the core components of the AFC system 200 to determine and identify faults (and/or possible faults) as to alert the need for corrective action and/or preventative maintenance.

While an example manner of implementing the control system is illustrated in FIG. 2, one or more of the elements, processes and/or devices illustrated in FIG. 2 may be combined, divided, re-arranged, omitted, eliminated and/or implemented in any other way. Further, the example AFC control computer 214, including the example power commander 226, the example speed determiner 228, the example power determiner 230, the example fault determiner 232, the example alert generator 234, and/or the example device controller 236, the example motor controller 216, the example ATRU 218, the example breaker 220, and/or, more generally, the example control system 212 of FIG. 2 may be implemented by hardware, software, firmware and/or any combination of hardware, software and/or firmware. Thus, for example, any of the example AFC control computer 214, including the example power commander 226, the example speed determiner 228, the example power determiner 230, the example fault determiner 232, the example alert generator 234, and/or the example device controller 236, the example motor controller 216, the example ATRU 218, the example breaker 220 and/or, more generally, the example control system 212 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example AFC control computer 214, including the example power commander 226, the example speed determiner 228, the example power determiner 230, the example fault determiner 232, the example alert generator 234, and/or the example device controller 236, the example motor controller 216, the example ATRU 218, and/or the example breaker 220 is/are hereby expressly defined to include a non-transitory computer readable storage device or storage disk such as a memory, a digital versatile disk (DVD), a compact disk (CD), a Blu-ray disk, etc. including the software and/or firmware. Further still, the example control system 212 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 10:
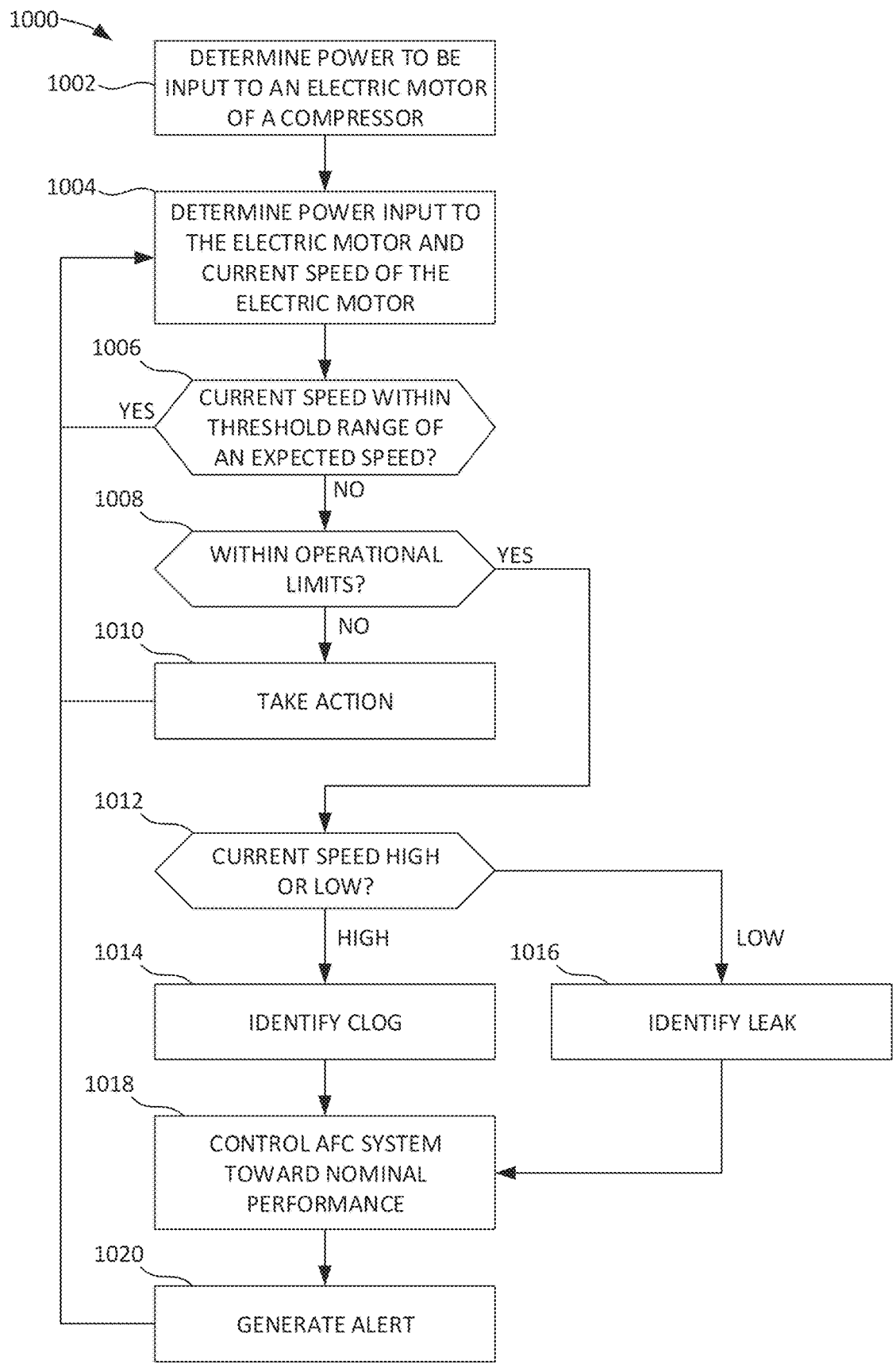
FIG. 10 is a flowchart representative of example machine readable instructions that can be executed to implement an example control system of the example AFC system of FIG. 2.

A flowchart representative of example hardware logic, machine readable instructions, hardware implemented state machines, and/or any combination thereof for implementing the control system 212 of FIG. 2 is shown in FIG. 10. The machine readable instructions may be one or more executable programs or portion(s) of an executable program for execution by a computer processor and/or processor circuitry, such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIG. 10, many other methods of implementing the example control system 212 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example process of FIG. 10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 10 is a flowchart of an example process 1000 that can be implemented by the control system 212 for monitoring the AFC system 200 and taking corrective or preventative actions. At block 1002, the power commander 226 determines an amount of power to be input to the electric motor 208 for driving the compressor 206. In some examples, the power is based on a desired mass flow rate to be achieved through the nozzles 202. The desired mass flow rate may be based on a flight maneuver (e.g., landing, taking off, etc.) and/or one or more flight conditions (e.g., the altitude the aircraft 100, the speed of the aircraft 100, the ambient temperature, etc.) of the aircraft 100. In some examples, various mass flow rates and power combinations are stored in the database 222. The power commander 226 determines the power corresponding to the desired mass flow rate. The motor controller 216 activates the electric motor 208 at the commanded power, which drives the compressor 206 to produce the desired mass flow rate.

At block 1004, the power determiner 230 determines the amount of power input (e.g., applied) to the electric motor 208 and the speed determiner 228 determines the current speed of the electric motor 208 (and, thus, the current speed of the compressor 206) while the power is input to the electric motor 208. In some examples, the speed determiner 228 determines the current speed of the electric motor 208 based on the back-EMF of the electric motor 208.

At block 1006, the fault determiner 232 determines whether the current speed is within a threshold range of an expected speed for the corresponding power. The expected speed may be based on at least one of one or more flight conditions (e.g., air temperature, altitude, speed, etc.), the power and speed performance map of the AFC system 200, or the power and speed performance map of the compressor 206. In some examples, the database 222 includes various expected speeds corresponding to various powers and various combinations of these parameters. The threshold range may be a predetermined range saved in the database 222. The range may be represented by a specific value or a percentage, for example. If the current speed is within the threshold range of the expected speed, control proceeds back to block 1004 and the control system 212 continues to monitor the speed and the power.

If the current speed is not within the threshold range, the fault determiner 232, at block 1008, determines whether the current speed and power are within the operational limits of the compressor 206 and the electric motor 208. For example, the fault determiner 232 may consult the plot 800 of FIG. 8, which may be stored in the database 222. If the speed and power fall outside of the operational limit lines 806, 808, the fault determiner 232 determines the compressor 206 and the electric motor 208 are operating outside of their operational limits.

If the compressor 206 and the electric motor 208 are operating outside of their operational limits, the control system 212, at block 1010, takes an action to prevent damage to the AFC system 200. In some examples, the control system 212 disables the AFC system 200. For example, if the compressor 206 is in the surge or choke territory, the device controller 236 can activate (e.g., switch) the breaker 220 to cease power to the electric motor 208. As another example, if the AFC system 200 is clogged and the pressure in the plenum 204 is increasing, the device controller 236 can open the relief valve 238 to relieve pressure from the plenum 204. In other examples, the control system 212 can take other actions to correct or mitigate the situation.

If the compressor 206 and the electric motor 208 are operating within their operational limits (determined at block 1008), the fault determiner 232, at block 1012, determines whether the current speed is high or low. In some examples, the fault determiner 232 compares the current speed to one or more thresholds. If the current speed is above a threshold, the current speed is considered high, and if the current speed is below a threshold, the current speed is consider low. In some examples, the threshold is a percentage of the expected speed. For example, assume the threshold is 5%. If the current speed is higher than 5% above the expected speed, the fault determiner 232 determines the current speed is high. If the current speed is lower than 5% below the expected speed, the fault determiner 232 determines the current speed is low. Therefore, the threshold range is 95% to 105% of the expected speed. In other examples, the threshold can be another percentage. In other examples, the threshold can be an absolute value. For example, if the expected speed is 15 krpm, and the threshold is 2 krpm, then the upper threshold is 17 krpm and the lower threshold may be 13 krpm. In other examples, the threshold can be another absolute value.

If the current speed is considered high for a given power input, the fault determiner 232 identifies the fault as a clog (e.g., one or more of the nozzles 202 are clogged) at block 1014. If the current speed is considered low for a given input power, the fault determiner 232 identifies the fault as a leak (e.g., a leak in the plenum 204) at block 1016. Therefore, the fault determiner 232 can determine a fault has occurred in the AFC system 200 based on the current speed of the electric motor 208. In some examples, the fault determiner 232 saves a data entry in the database 222 to record the occurrence of a fault and the type of fault ((e.g., a clog or a leak).

In some examples, at block 1018, the control system 212 controls the AFC system 200 to reach its nominal performance (e.g., the desired mass flow rate). For example, if the fault determiner 232 determines a clog exists, the power commander 226 can select a higher power to be input to electric motor 208. The motor controller 216 then increases the power input to the electric motor 208 to increase the speed of the electric motor 208 and, thus, increase the mass flow rate toward the desired mass flow rate. The power commander 226 can consult the plot as shown in FIG. 9 to determine a corresponding speed and power to result in the same or similar mass flow rate (e.g., ±%10). As another example, if the fault determiner 232 determines a leak exists, the power commander 226 can select a higher power to be applied to the electric motor 208 (e.g., up to the operational limits of the compressor 206 and the electric motor 208) to compensate for the loss of mass flow rate out of the nozzles 202. Therefore, in some examples, in response to determining a fault has occurred, the control system 212 increases or decreases the power input to the electric motor 208. In other examples, the control system 212 may not take any corrective measures and instead may continue to operate the compressor 206 at the reduced capacity.

In some examples, at block 1020, the alert generator 234 generates an alert to indicate to a pilot, mechanic, and/or other aircraft personnel that a fault has occurred. The alert may be an activation of a light, display of a message, activation of audible alert, and/or any other type of alert. In some examples, the alert indicates the type of fault (e.g., clog, leak, worn compressor, etc.). In some examples, in response to determining a fault has occurred, the alert generator 234 generates an alert in the flight deck 240 of the aircraft 100. In other examples, an alert may not be generated.

After block 1020, control proceeds to block 1004 and the example process 1000 repeats. Thus, the example process 1000 can be repeated to continuously monitor the health of the AFC system 200.

Figure 11:
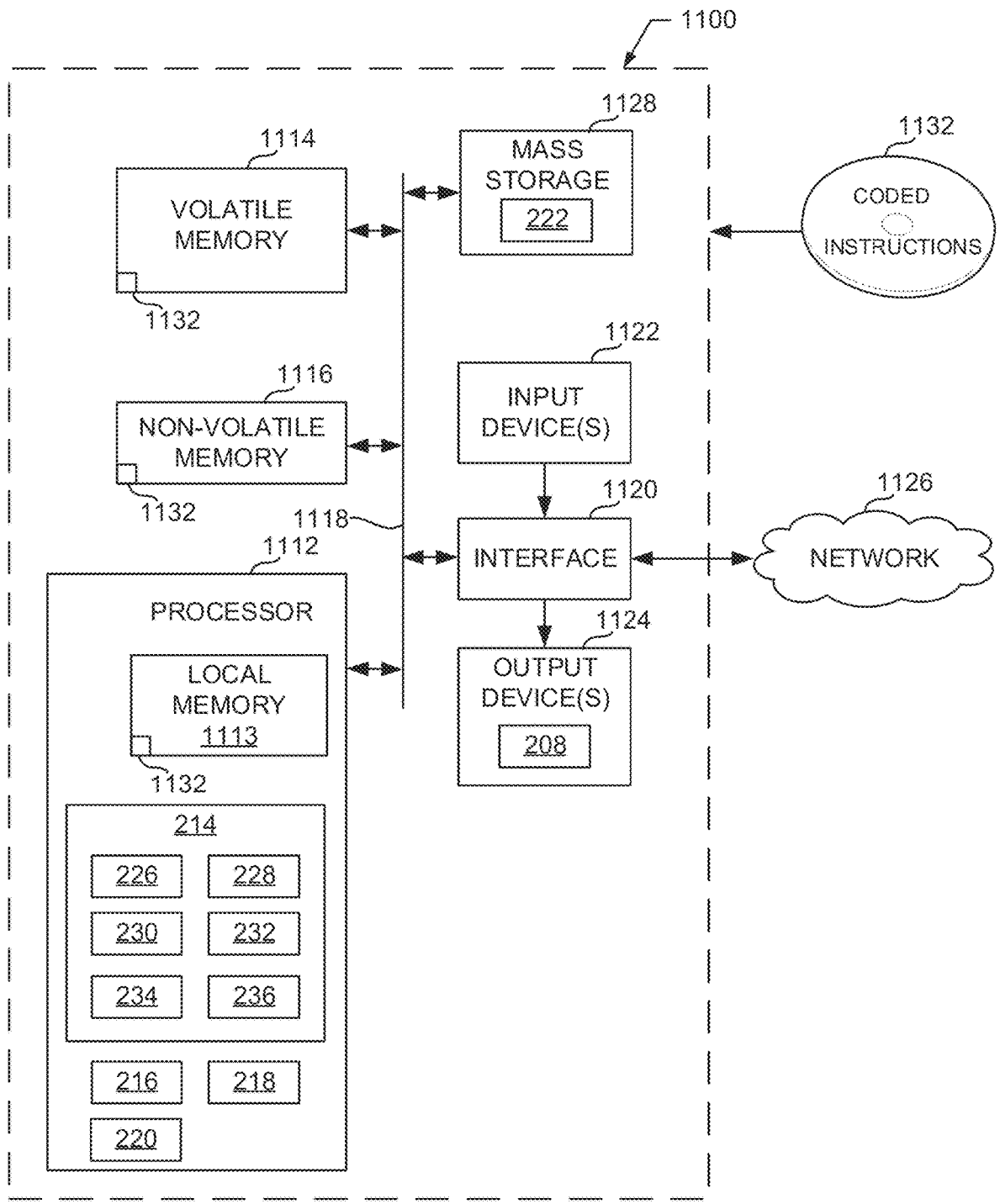
FIG. 11 is a block diagram of an example processing platform structured to execute the instructions of FIG. 10 to implement the example control system of the example AFC system of FIG. 2.

FIG. 11 is a block diagram of an example processor platform 1100 structured to execute the instructions of FIG. 10 to implement the control system 212 of FIG. 2. The processor platform 1100 can be, for example, a server, a personal computer, a workstation, a self-learning machine (e.g., a neural network), a mobile device (e.g., a cell phone, a smart phone, a tablet such as an iPad™), or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1112 implements the example AFC control computer 214, including the example power commander 226, the example speed determiner 228, the example power determiner 230, the example fault determiner 232, the example alert generator 234, and the example device controller 236, the example motor controller 216, the example ATRU 218, and the example breaker 220.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a device and/or a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. In this example, the output device(s) 1124 includes the electric motor 208. Additionally or alternatively, the output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives. In some examples, the mass storage 1128 includes the database 222.

The machine executable instructions 1132 of FIG. 10 may be stored in the mass storage device 1128, in the volatile memory 1114, in the non-volatile memory 1116, and/or on a removable non-transitory computer readable storage medium such as a CD or DVD.

From the foregoing, it will be appreciated that example methods, systems, apparatus and articles of manufacture have been disclosed that monitor AFC system health and detect faults without the need for additional sensors or equipment as would be required by conventional health monitoring approaches. The examples disclosed herein advantageously leverage information from existing hardware to monitor the state of the AFC system and detect if a fault occurs. As a result, the examples disclosed herein reduce complexity, volume, and weight compared to conventional health monitoring approaches. The examples disclosed herein can also dynamically adjust to compensate for a fault and move the AFC system back toward nominal performance, thereby improving reliability of the AFC system.

Example methods, apparatus, systems, and articles of manufacturing for controlling an active flow control system are disclosed herein. Further examples and combinations include the following:

Example 1 an active flow control system for an aircraft. The active flow control system includes a plenum, a plurality of nozzles fluidly coupled to the plenum, the plurality of nozzles configured to eject high pressure air across a control surface, a compressor to supply pressurized air to the plenum, an electric motor to drive the compressor, and a control system. The control system is to determine an amount of power input to the electric motor, determine a current speed of the electric motor, and determine a fault has occurred in the active flow control system based on the current speed of the electric motor.

Example 2 includes the active flow control system of Example 1, wherein the control system is to determine the current speed of the electric motor based on back-EMF of the electric motor.

Example 3 includes the active flow control system of Examples 1 or 2, wherein the control system is to, in response to determining the fault has occurred, increase or decrease the power input to the electric motor.

Example 4 includes the active flow control system of any of Examples 1-3, wherein the fault is a clog, and wherein the control system is configured to, in response to determining the clog has occurred, increase the power input to the electric motor to increase the current speed of the electric motor.

Example 5 includes the active flow control system of any of Examples 1-4, wherein the control system is to determine whether the fault is a clog or a leak based on the current speed.

Example 6 includes the active flow control system of any of Examples 1-5, wherein the control system is to determine the fault has occurred by determining whether the current speed of the electric motor is within a threshold range of an expected speed of the electric motor associated with the power.

Example 7 includes the active flow control system of any of Examples 1-6, wherein the control system is configured to determine the presence of a clog in a nozzle based on a change in speed of the electric motor that exceeds a predetermined threshold, and configured to responsively determine an increased power level supplied to the electric motor to yield an increased motor speed that increases a current mass flow rate of pressurized air through the plenum and remaining open nozzles to a desired mass flow rate of pressurized air to maintain active flow control system performance.

Example 8 includes the active flow control system of any of Examples 1-7, wherein the expected speed is based on at least one of an aircraft flight condition, a power and speed performance map for the active flow control system, or a power and speed performance map for the compressor, and wherein the control system includes a database to store the power and speed performance map for the active flow control system and the power and speed performance map for the compressor.

Example 9 includes the active flow control system of any of Examples 1-8, wherein the control system is to determine whether the compressor is operating within operational limits of the compressor.

Example 10 includes the active flow control system of Example 9, wherein the control system is to, in response to determining the compressor is not operating within the operational limits, to activate a breaker to cease power to the electric motor.

Example 11 includes the active flow control system of Examples 9 or 10, wherein the control system is to, in response to determining the compressor is not operating within the operational limits, the control system is to open a relief valve coupled to the plenum.

Example 12 is a non-transitory computer readable medium including instructions that, when executed, cause at least one processor to at least determine an amount of power input to an electric motor of a compressor of an active flow control system of an aircraft, determine a current speed of the electric motor while the power is input to the electric motor, and determine a fault has occurred in the active flow control system based on the current speed of the electric motor.

Example 13 includes the non-transitory computer readable medium of Example 12, wherein the fault is a clog, and wherein the instructions, when executed, cause the at least one processor to, in response to determining the clog has occurred, increase the power input to the electric motor to increase the current speed of the electric motor.

Example 14 includes the non-transitory computer readable medium of Examples 12 or 13, wherein the instructions, when executed, cause the at least one processor to, in response to determining the fault has occurred, generate an alert in a flight deck of the aircraft.

Example 15 includes the non-transitory computer readable medium of any of Examples 12-14, wherein the instructions, when executed, cause the at least one processor to determine the current speed of the electric motor based on back-EMF of the electric motor.

Example 16 includes the non-transitory computer readable medium of any of Examples 12-15, wherein the instructions, when executed, cause the at least one processor to determine the fault has occurred by determining whether the current speed of the electric motor is within a threshold range of an expected speed of the electric motor associated with the power.

Example 17 is a method for an active flow control system for an aircraft. The method includes determining, by executing an instruction with at least one processor, a current speed of an electric motor that drives a compressor supplying pressurized air to a plenum coupled to a plurality of nozzles that eject high pressure air across a control surface, determining, by executing an instruction with the at least one processor, whether the current speed of the electric motor is within an operational limit, and disabling, by executing an instruction with the at least one processor, the active flow control system based on the determination of whether the current speed of the electric motor is within the operational limit.

Example 18 includes the method of Example 17, further including, if the current speed of the electric motor is within the operational limit, determining, by executing an instruction with the at least one processor, whether a fault has occurred in the active flow control system based on the current speed.

Example 19 includes the method of Example 18, wherein the fault is a clog in a nozzle, and wherein the method further includes, in response to determining that a clog has occurred, increase power input to the electric motor to increase the current speed of the electric motor.

Example 20 includes the method of Examples 18 or 19, further including determining that the fault is the presence of the clog in a nozzle based on a change in speed of the electric motor that exceeds a predetermined threshold, and determining an increased power level supplied to the electric motor to yield an increased motor speed to increase a current mass flow rate of pressurized air through the plenum and remaining open nozzles to a desired mass flow rate of pressurized air for maintaining active flow control.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An active flow control system for an aircraft, the active flow control system comprising:
   a plenum;
   a plurality of nozzles fluidly coupled to the plenum, the plurality of nozzles configured to eject high pressure air across a control surface;
   a compressor to supply pressurized air to the plenum;
   an electric motor to drive the compressor; and
   a control system to:
      determine an amount of power input provided to the electric motor;
      determine a current speed of the electric motor;
      determine a fault has occurred in the active flow control system based on at least one of the current speed of the electric motor or the amount of power input provided to the electric motor, the fault corresponding to at least one clog of the active flow control system;
      determine a number of clogs in a corresponding number of nozzles of the active flow control system;
      determine an increased amount of power input to the electric motor based on the number of clogs; and
      in response to determining the fault has occurred, increase an output of the electric motor by applying the increased amount of power input to the electric motor.

2. The active flow control system of claim 1, wherein the control system is to determine the current speed of the electric motor based on back-EMF of the electric motor.

3. The active flow control system of claim 1, the increased amount of power input to the electric motor increases the speed of the electric motor.

4. The active flow control system of claim 1, wherein the control system is to determine the fault has occurred by determining whether the current speed of the electric motor is within a threshold range of an expected speed of the electric motor associated with the power.

5. The active flow control system of claim 1, wherein the control system is configured to determine a presence of a clog in a nozzle based on a change in speed of the electric motor that exceeds a predetermined threshold, and the system is configured to responsively determine an increased power level supplied to the electric motor to yield an increased motor speed that increases a current mass flow rate of pressurized air through the plenum and remaining open nozzles to a desired mass flow rate of pressurized air to maintain active flow control system performance.

6. The active flow control system of claim 4, wherein the expected speed is based on at least one of an aircraft flight condition, a power and speed performance map for the active flow control system, or a power and speed performance map for the compressor, and wherein the control system includes a database to store the power and speed performance map for the active flow control system and the power and speed performance map for the compressor.

7. The active flow control system of claim 1, wherein the control system is to determine whether the compressor is operating within operational limits of the compressor.

8. The active flow control system of claim 7, wherein the control system is to, in response to determining the compressor is not operating within the operational limits, to activate a breaker to cease power to the electric motor.

9. The active flow control system of claim 7, wherein the control system is to, in response to determining the compressor is not operating within the operational limits, open a relief valve coupled to the plenum.

10. A non-transitory computer readable medium comprising instructions that, when executed, cause at least one processor to at least:
   determine an amount of power input provided to an electric motor of a compressor of an active flow control system of an aircraft;
   determine a current speed of the electric motor while the power input is provided to the electric motor;
   determine a fault has occurred in the active flow control system based on at least one of the current speed of the electric motor or the amount of power input provided to the electric motor, the fault corresponding to a clog of the active flow control system;
   determine a number of clogs in a corresponding number of nozzles of the active flow control system;
   determine an increased amount of power input to the electric motor based on the number of clogs; and
   in response to determining the fault has occurred, increase an output of the electric motor by applying the increased amount of power input to the electric motor.

11. The non-transitory computer readable medium of claim 10, wherein the instructions, when executed, cause the at least one processor to, in response to determining the fault has occurred, generate an alert in a flight deck of the aircraft.

12. The non-transitory computer readable medium of claim 10, wherein the instructions, when executed, cause the at least one processor to determine the current speed of the electric motor based on back-EMF of the electric motor.

13. The non-transitory computer readable medium of claim 10, wherein the instructions, when executed, cause the at least one processor to determine the fault has occurred by determining whether the current speed of the electric motor is within a threshold range of an expected speed of the electric motor associated with the power.

14. A method for an active flow control system for an aircraft, the method comprising:
   determining, by executing an instruction with at least one processor, a current speed of an electric motor that drives a compressor supplying pressurized air to a plenum coupled to a plurality of nozzles that eject high pressure air across a control surface;
   determining, by executing an instruction with the at least one processor, an amount of power input provided to the electric motor;
   determining, by executing an instruction with the at least one processor, whether a fault has occurred in the active flow control system based on at least one of the current speed of the electric motor or the amount of power input provided to the electric motor, the fault corresponding to a clog of the active flow control system;
   determining, by executing an instruction with the at least one processor, a number of clogs in a corresponding number of nozzles of the active flow control system;
   determining, by executing an instruction with the at least one processor, an increased amount of power input to the electric motor based on the number of clogs; and
   increasing an output of the motor, by executing an instruction with the at least one processor, in response to the determination that the fault has occurred by applying the increased amount of power input to the electric motor.

15. The method of claim 14, further including determining that the fault corresponds to the clog in the active flow control system based on a change in speed of the electric motor that exceeds a predetermined threshold, and determining an increased power level supplied to the electric motor to yield an increased motor speed to increase a current mass flow rate of pressurized air through the plenum and remaining open nozzles to a desired mass flow rate of pressurized air for maintaining active flow control.

16. The method of claim 14, further including:
   determining whether the current speed of the electric motor is within an operational limit, and
   disabling the active flow control system based on the determination that the current speed of the electric motor is within the operational limit.

17. The active flow control system of claim 1, wherein the control system is to compare the number of clogs to a threshold to determine that the fault has occurred.

18. The active flow control system of claim 1, wherein the control system is to compare a number of unclogged nozzles to a threshold to determine that the fault has occurred.

19. The active flow control system of claim 1, wherein the control system is to determine the increased amount of power input based on a database of motor speeds and mass flow rates.

20. The active flow control system of claim 1, wherein the control system is to determine the increased amount of power input based on maintaining a mass flow rate of the nozzles.

* * * * *

UNITED STATES PATENT AND TRADEMARK OFFICE
CERTIFICATE OF CORRECTION

PATENT NO. : 12,040,730 B2
APPLICATION NO. : 16/880499
DATED : July 16, 2024
INVENTOR(S) : Rafferty et al.

Page 1 of 1

It is certified that error appears in the above-identified patent and that said Letters Patent is hereby corrected as shown below:

In the Claims

In Column 22, Claim 3, Line 10, insert --"wherein"--.

Signed and Sealed this
Twenty-sixth Day of November, 2024

Katherine Kelly Vidal
*Director of the United States Patent and Trademark Office*